Patented Dec. 22, 1931

1,837,680

UNITED STATES PATENT OFFICE

EDUARD SCHNITZLER, OF DESSAU IN ANHALT, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

ADHESIVE STRIP

No Drawing. Application filed December 13, 1928, Serial No. 325,936, and in Germany December 17, 1927.

Paper or fabric coated with gum or rubber, such as is used in the form of adhesive strips, is generally wound to form a roll. The unwinding of the roll is difficult because the sticky surface adheres to the surface which is not coated with the sticky substance. Attempts to overcome the difficulty by coating with paraffin wax the surface which is not coated with the sticky substance have not been successful because the paraffin wax injuriously affects the sticky surface.

The present invention relates to a new adhesive strip comprising a material such as paper or fabric having on that side which is not provided with the sticky substance a coating of a cellulose derivative containing a radicle of a higher fatty acid. An adhesive strip is thus obtained which can be unwound very easily, since there is no adhesion of the sticky surface to the reverse surface of the strip. The adhesive power of the sticky substance is not injured by the coating.

Cellulose laurate has proved to be a particularly suitable ester for use according to the invention but also other cellulose esters or cellulose ether-esters may be used, which contain a radicle of a higher fatty acid. Such cellulose derivatives are for instance: cellulose stearate, cellulose acetate laurate, cellulose stearate laurate, ethyl-cellulose laurate. In order to be applied to the material to be coated the mentioned cellulose derivatives may be used when dissolved in suitable solvents. For this purpose any known organic solvent may be used.

What I claim is:—

1. An adhesive strip comprising a material having on that side which is not provided with the sticky substance a coating of a cellulose derivative containing a radicle of a higher fatty acid.

2. An adhesive strip comprising a material having on that side which is not provided with the sticky substance a coating of a cellulose derivative containing a radicle of lauric acid.

3. An adhesive strip comprising a material having on that side which is not provided with the sticky substance a coating of cellulose laurate.

4. An adhesive strip comprising a material having on that side which is not provided with the sticking substance a coating of a cellulose derivative selected from the group consisting of cellulose esters and ether-esters containing in their molecule the radicle of lauric acid.

In testimony whereof, I affix my signature.

EDUARD SCHNITZLER.